US012536837B2

(12) United States Patent
Magalhães et al.

(10) Patent No.: US 12,536,837 B2
(45) Date of Patent: Jan. 27, 2026

(54) OBJECT IDENTIFICATION AND LABELING WITH SIGN LANGUAGE

(71) Applicant: Lenovo (Singapore) Pte. Ltd., Singapore (SG)

(72) Inventors: Eduardo Pinto Magalhães, Campinas (BR); Silvan Ferreira da Silva Junior, Caraúbas (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 339 days.

(21) Appl. No.: 18/459,769

(22) Filed: Sep. 1, 2023

(65) Prior Publication Data

US 2025/0078575 A1    Mar. 6, 2025

(51) Int. Cl.
*G06V 40/20*    (2022.01)
*G06V 10/764*    (2022.01)
*G06V 20/70*    (2022.01)

(52) U.S. Cl.
CPC ............ *G06V 40/28* (2022.01); *G06V 10/764* (2022.01); *G06V 20/70* (2022.01)

(58) Field of Classification Search
CPC ....... G06V 40/28; G06V 20/70; G06V 10/764
See application file for complete search history.

(56) References Cited

U.S. PATENT DOCUMENTS

| 11,294,474 | B1* | 4/2022 | Stewart | G06V 40/113 |
| 2014/0316763 | A1* | 10/2014 | Tardif | G06F 40/44 |
| | | | | 704/3 |
| 2016/0091964 | A1* | 3/2016 | Iyer | G06V 20/20 |
| | | | | 715/863 |
| 2016/0203360 | A1* | 7/2016 | Alvarez | G06V 40/28 |
| | | | | 345/156 |
| 2016/0328604 | A1* | 11/2016 | Bulzacki | G06V 40/20 |
| 2018/0075659 | A1* | 3/2018 | Browy | G02B 27/0172 |
| 2021/0279453 | A1* | 9/2021 | Luqman | G06F 18/2431 |
| 2023/0350495 | A1* | 11/2023 | Vaday | G02B 27/0101 |
| 2024/0404430 | A1* | 12/2024 | Currie | G06F 40/58 |
| 2025/0013683 | A1* | 1/2025 | Granieri | G06F 3/017 |
| 2025/0078577 | A1* | 3/2025 | Bedri | G06V 10/82 |

OTHER PUBLICATIONS

Raheja, Jagdish Lal, Mona Chandra, and Ankit Chaudhary. "3D gesture based real-time object selection and recognition." Pattern Recognition Letters 115 (2018): 14-19. (Year: 2018).*

\* cited by examiner

*Primary Examiner* — Utpal D Shah
(74) *Attorney, Agent, or Firm* — Schwegman Lundberg & Woessner, P.A.

(57) ABSTRACT

Image data are received into a system. The image data include an object. A first gesture of a human hand is detected in the image data. The first gesture identifies the object for processing. A second gesture of the human hand is detected. The second gesture indicates a readiness to accept a third gesture, and then the third gesture is detected. The object is labeled with the third gesture, and the labeled object is stored in a database. The third gesture can be a sign from a sign language.

20 Claims, 5 Drawing Sheets

OBJECT IDENTIFICATION AND LABELING WITH SIGN LANGUAGE

TECHNICAL FIELD

Embodiments described herein generally relate to the identification of objects and the sign language labeling of those objects, and in an embodiment, but not by way of limitation, automatic and dynamic object identification, sign language labeling, and storing of those sign language labeled objects to generate a database used in a sign language environment.

BACKGROUND

Systems exist that can associate a sign from a signing language with an object. For example, there are systems such as LabelImg, Labelme, RectLabel, CVAT, VOTT, Boobs, Losslesscut, V7 and VIA. However, these systems have several shortcomings. None of these systems interactively (using gestures) and automatically label objects using machine learning classification techniques. They do not optimize the time and process of creating datasets, and they are not accurate, as their boxes and polygons need to be manually adjusted, and sometimes they need boxes to be fixed. Also, these systems are not agile, that is, the user needs to spend some time learning to use the system and has to employ excessive mouse and keyboard control to adjust bounding boxes or any type of contour to classify an object. Consequently, there is therefore currently a need for agile systems that make labels and record signs in an automated way with no dependence on clicks, with greater interaction of users, and that can be used in connection with classifiers in computer vision.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

As noted above, systems exist that can associate a sign from a signing language with an object. None of these systems however interactively (using gestures) and automatically label objects using machine learning classification techniques. They do not optimize the time and process of creating datasets. Further, they are not accurate, since their boxes and polygons need to be manually adjusted, and sometimes they need boxes to be fixed. They are also not agile. That is, the user needs to spend some time learning to use the system. Additionally, users must exercise excessive mouse and keyboard control to adjust bounding boxes or any type of contour to classify an object. These prior systems cannot record signs automatically and dynamically using gestures, which is often necessary in systems (recognition software) that work with languages of the deaf or classifiers using a single training example video. Further, such prior systems lack classifiers and automatic detectors.

An object of disclosed embodiments therefore is to record signs automatically and dynamically using gestures. This can be beneficial in systems that work with languages of the deaf or classifiers using a single training example video.

An embodiment relates to an automatic and dynamic system and method of image processing, storage and creation of datasets to be used in sign languages (e.g., American Sign Language), and mainly in a sign language classifier that, for example, uses only one video (one-shot learning). That is, the embodiment serves as a sign language maker simply by directing gestures on a screen, without any manual text-based description. The embodiment provides for automated and dynamic creation of signs for objects in a scene that are detected, signed, recorded and labeled for any type of sign language.

In a conventional sign language annotator, creating a rectangle around the object and clicking the "save" button on the annotator toolbar is a manual and expensive task. In contrast, embodiments of the present disclosure record labeled signs automatically using tools, current recognition libraries (which can be in python language), as well as machine learning networks (classifiers) as guided by a user on a screen, either with a notebook, a cell phone, a personal computer, or a tablet. Every classified object and every sign recorded by an embodiment is added to a database, whose label and sign can be temporarily assigned, since the system allows the object detector to be updated and a new recording to be made again on top of an already labeled object.

Figure 1:
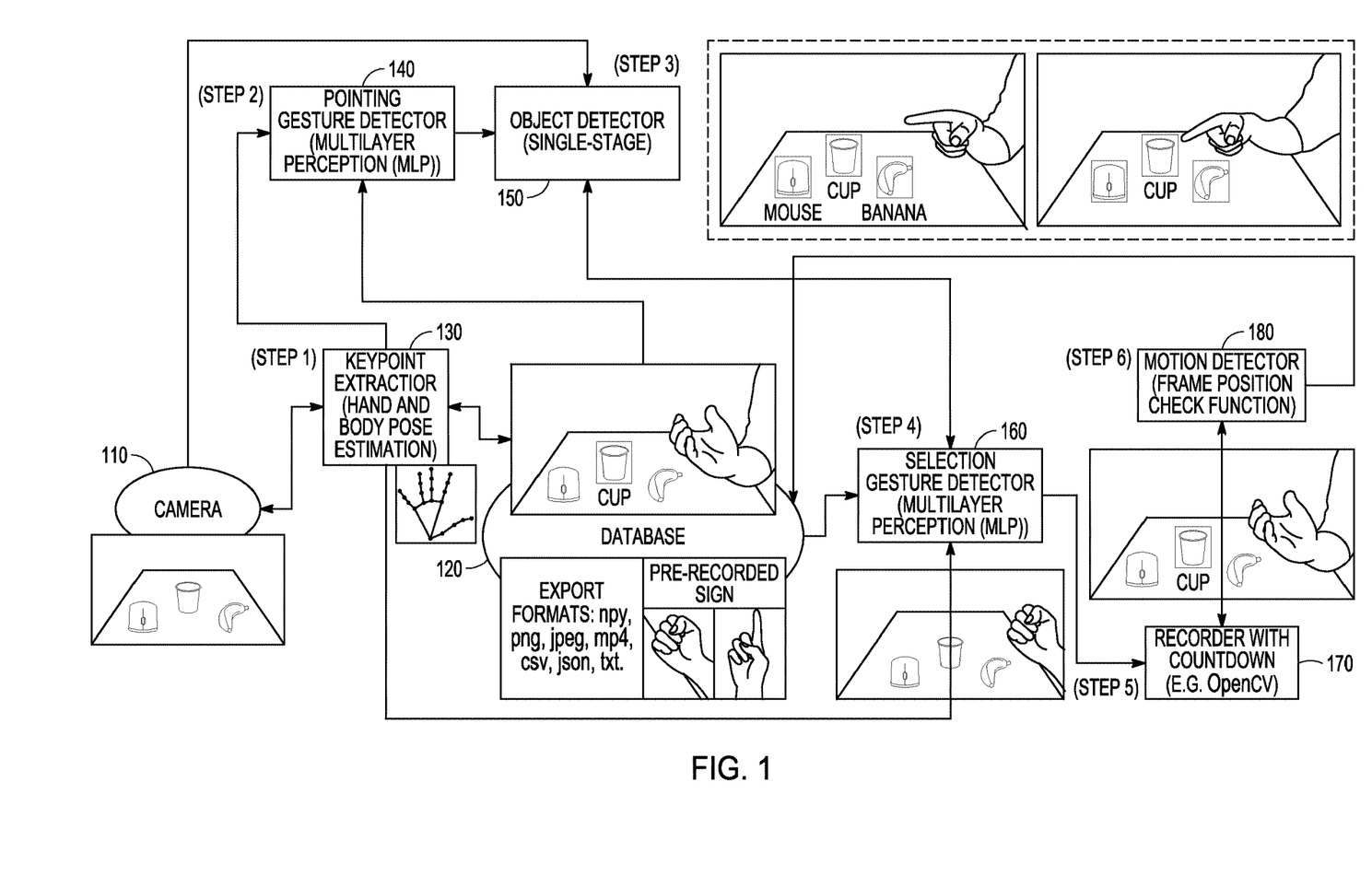
FIG. 1 is a block diagram of a system to automatically identify objects in a scene and label or associate those objects with a sign from a signing language.

Referring to FIG. 1, in an embodiment, the system includes a camera 110 and a database 120, and further includes several modules—a keypoint extractor module (hand and body pose estimation) 130, a pointing gesture detector module (classifier: a multilayer perceptron deep network—MLP) 140, an object detector module (single stage) 150, a selection detector module detector (classifier: a Multilayer Perceptron Deep Network (MLP) 160, a recorder module 170, and a motion detector module 180. The embodiment identifies and labels an object in a scene or environment, automatically and dynamically records and re-records signs based on a user's gesture directions, and exports information about the object and the sign.

The embodiment functionality consists of a live or recorded video as the input, for which a hand and body pose estimation is performed using extracted pose and user hand keypoints from a skeleton extractor. Concurrently, if the user's hand keypoints match a predefined hand configuration coming from the database, the pointing gesture detector (e.g., a multilayer perceptron (MLP)) activates an object detector (single-stage), and consequently the objects in the scene will be detected and classified in a practical and visual way, whose bounding and precise boxes will be automatically presented on a notebook/cell phone/tablet/monitor screen to monitor the process. It is noteworthy that at that moment the object has already been chosen and indicated with the finger for the next step, which is the sign recording process. Next, the selection gesture detector (which can be the same classifier as the pointing gesture) waits for and detects a pre-recorded hand shape sign, which is different from the pointing sign and which is also available in the database. That is, the user is prompted by a classifier, referred to as the selection gesture detector, for a sign to start recording. After the selection gesture given by the user, the recorder module displays a countdown on a screen informing the user that the recording will start in a few seconds. In an embodiment, this countdown time can be configured. The user then records a sign for the object, and as soon as the user's hands go down, i.e. when there is a pause in recording, a motion detector stops the recording. The object is then classified, it is labeled with the sign that the user just provided, and it is recorded and saved in the database. If the user requests an exchange of a sign that is already in the database, that is, a new sign for an object that already exists in the database, the user will make the gesture of pointing to the object that has previously already been recorded, and information will appear on the screen asking the user if he wants to re-record the sign. If the user confirms the sign change, a selection gesture causes the system to start a new recording process starting at the selection gesture detector module. The system then exports several results including labeled frames in a sequence of images or a video with or without keypoints (e.g., in one or more of the following formats—PNG, JPEG, MP4, NPY, JSON, CSV, TXT).

Figure 2:
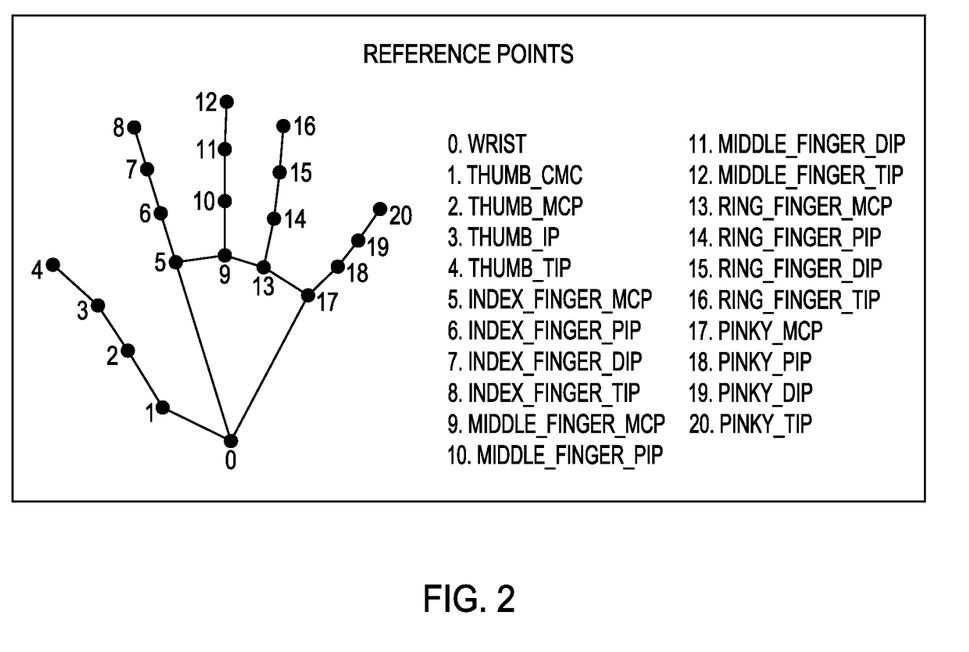
FIG. 2 illustrates an example of keypoints from a human hand.

Referring still to FIG. 1, the keypoint extractor module 130 detects keypoints from an image. Each keypoint corresponds to a set of X, Y and Z coordinates for a specific point on the body, such as a human hand. An example of the set of keypoints in illustrated in FIG. 2. This process allows the extraction of information related to the position of each point, eliminating the need to deal with more complex data, such as RGB images. In this embodiment, a hand and body pose estimation (framework) can be used for high-fidelity, robust and accurate body pose tracking. A module of great agility is needed in the process of performing the detection and extraction of points for processing time series data in real time. The keypoint extractor module 130 receives a video of a scene or environment, processes the data, and delivers the hand reference points to the pointing gesture detector (classifier) 140 according to the image of keypoints and their reference points. Examples of keypoint extractor modules include Mediapipe, Open Pose, Alpha Pose and DeepPose. The output of the keypoint extractor module can include keypoints of the hands and body (also referred to as landmarks). In addition, this module is also responsible for exporting the result (JSON, NPY, CSV) with the design of keypoints with a skeleton, since there is a communication between the keypoints extractor and the database.

The pointing gesture detector (multilayer perceptron classifier) 140 receives hand keypoints for classifying and predicting the hand shape. If the hand shape is the same as the hand shape class of an index finger, i.e. a prerecorded pointing sign, a deep network (multilayer perceptron (MLP)) performs the classification so that the user can direct their finger to the object in the scene and activate the bounding boxes of the object detector module (single-stage) 150. The embodiment, before initiating execution, asks the user to record the pointing sign. The pointing gesture detector module 140 needs the pointer signs to select objects on the screen of a notebook/cellphone/monitor/tablet.

The object detector module 150 is used to detect and classify object instances of certain classes in the image. Detection consists of locating and creating the bounding box coordinates of each object, and classification consists of determining the class most likely to be accurately associated with that object. In an embodiment, in the object detection module 150, a single-stage object detector is used for detection and classification, since it has a considerable amount of classes, robustness and state-of-the-art performance. A high-performance machine learning model can be used since it is more efficient than two separate neural networks to detect and predict objects separately. One of the features of object detector module 150 is the reduction by half of the number of false-positive detections that are normally present with R-CNNs and Fast R-CNNs, since such networks analyze images separately. Furthermore, the object detector module 150 can generalize multi-object classifications at the same time, making it more applicable to a variety of new environments and business cases. The object detector module 150 receives a video and returns the bounding boxes as well as the classes of objects detected in the scene. For this, in an embodiment, it contains convolutional layers, feature maps, FC layers and the outputs of classes and a bounding box regressor. The object detector module 150 can be trained with different objects to acquire new classes, as well as upgraded to be more accurate. When a user points to an object, the object detector module 150 understands that the object is the target of the labeling, and it separates the object and prepares the object for the selection gesture detector (Multilayer Perceptron (MLP)) 160.

The selection gesture detector (e.g, a multilayer perceptron classifier) module 160 can be the same module as the pointing gesture module 140. When the object detector (single-stage) module 150 creates its bounding box on the object and receives the user's input, the selection gesture detector module 160 waits for a pre-recorded sign from the user, called a selection gesture, which indicates the user is ready to record a sign to be used to label the object. In this module, the keypoints extractor module 130 is also used to classify the hand format. These pre-recorded signs can be any signs stored in the database that cause the commencement of the recorder, but they must be different from the pointing signs. In an embodiment, before powering on, the system prompts the user to record a recording initiation sign. This step assures that there is no physical/mechanical interface (e.g., a button on the keyboard, mouse, touch screen) between the user who is trying to record a sign on the smartphone/notebook/tablet. When the selection gesture detector module 160 has the information of the chosen object (e.g., a cup, a computer mouse, a banana) and the pre-recorded sign, which is the "can start recording" sign, it activates the recorder.

The database 120 is a systemic repository of data relating to pre-recorded and recorded signs that are used to trigger other modules such as the object selector module 150 and the pointing gesture detector (classifier) module 140. After the labeled sign leaves the recorder and passes through to the motion detector, it goes to the database. In addition, when the system starts, the system itself prompts the user to record pointing and recording start signs, among other signs that the user can record and add functions. The system exports several results including labeled frames in image sequences, a complete video with or without keypoints (PNG, JPEG, MP4), and/or metadata output in different formats (NPY, CSV, JSON, TXT). Since the signs are in the database, the keypoint extractor module 130 can communicate and export the body and hand keypoints automatically.

The sign recorder module 170, which can be a python OpenCV library, receives a confirmation binary from the selection gesture detector (Multilayer Perceptron (MLP)) module 160 according to the user's hand gesture. If the output of the selection gesture detector 160 corresponds to a high value, the recorder displays on the smartphone/laptop/tablet screen a countdown for the user to prepare for recording the sign to be associated with the object. At that moment, the user must be ready to perform the signs that will be recorded for the object. That is, the user must have his or her hands free to develop a sign language sign like ASL (American Sign Language) or any sign he wants to create for his object.

The motion detector module 180 finishes the recording of signs, and it can be implemented as a hand height detector and/or pose variation using keypoints or frames as input. The motion detector detects a lack of motion after recording the signs to be associated with an object. If a hand pixel that is in an "x" position goes to a "y" position, it means that there has been movement. Then, the position difference detects the motion and pauses the recording. That is, there is a check every frame if the X/Y coordinate of a selected point has varied below a threshold or reference point. In the workflow, when the user puts his or her hands down such that the camera cannot capture the hands, the motion detector module 180 starts a countdown to stop recording and delivers the labeled and recorded signs to the database. This makes the process completely automated.

Figure 3A:
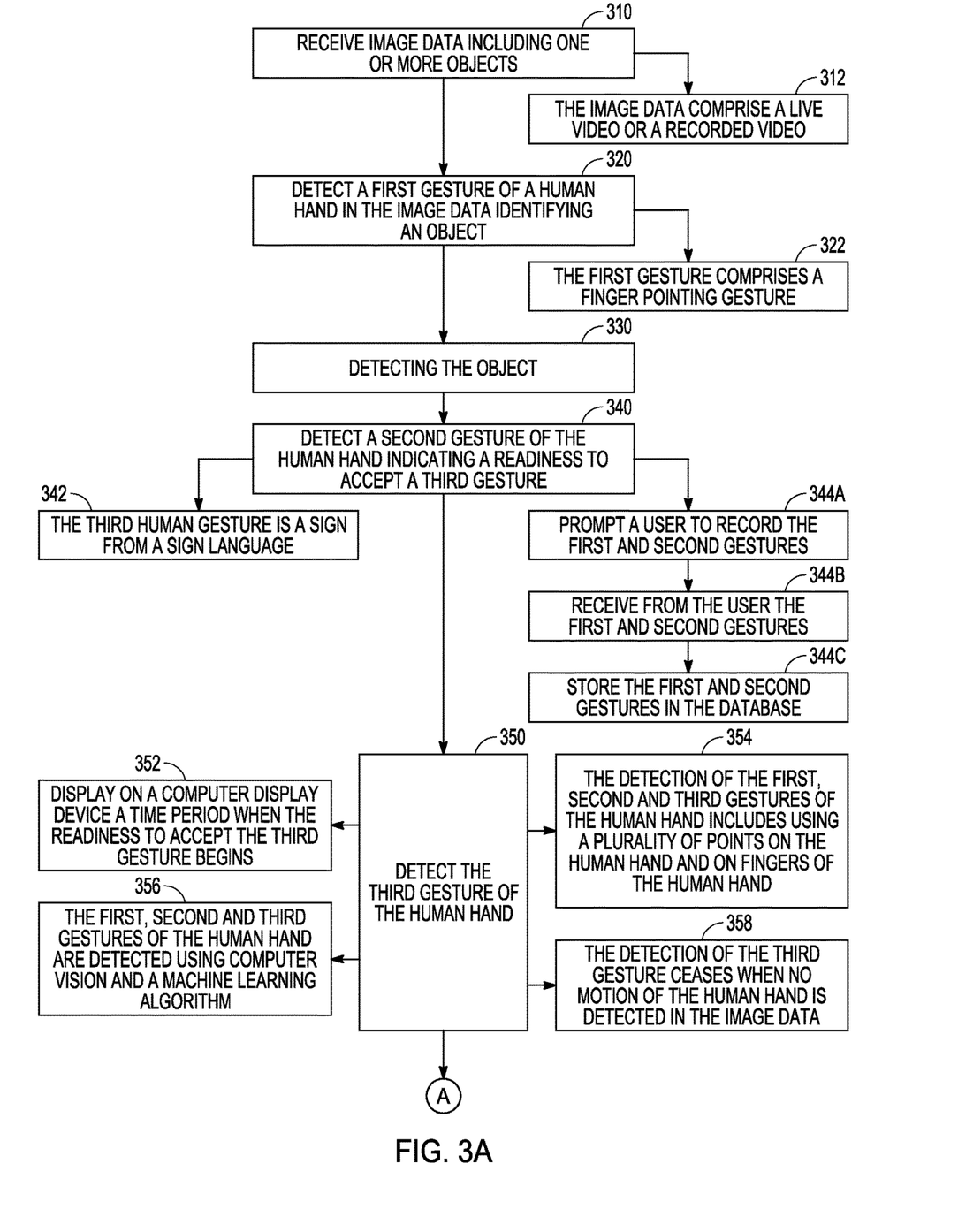
FIGS. 3A and 3B are a block diagram illustrating operations and features of a system to automatically identify objects in a scene and label or associate those objects with a sign from a signing language.
Figure 3B:
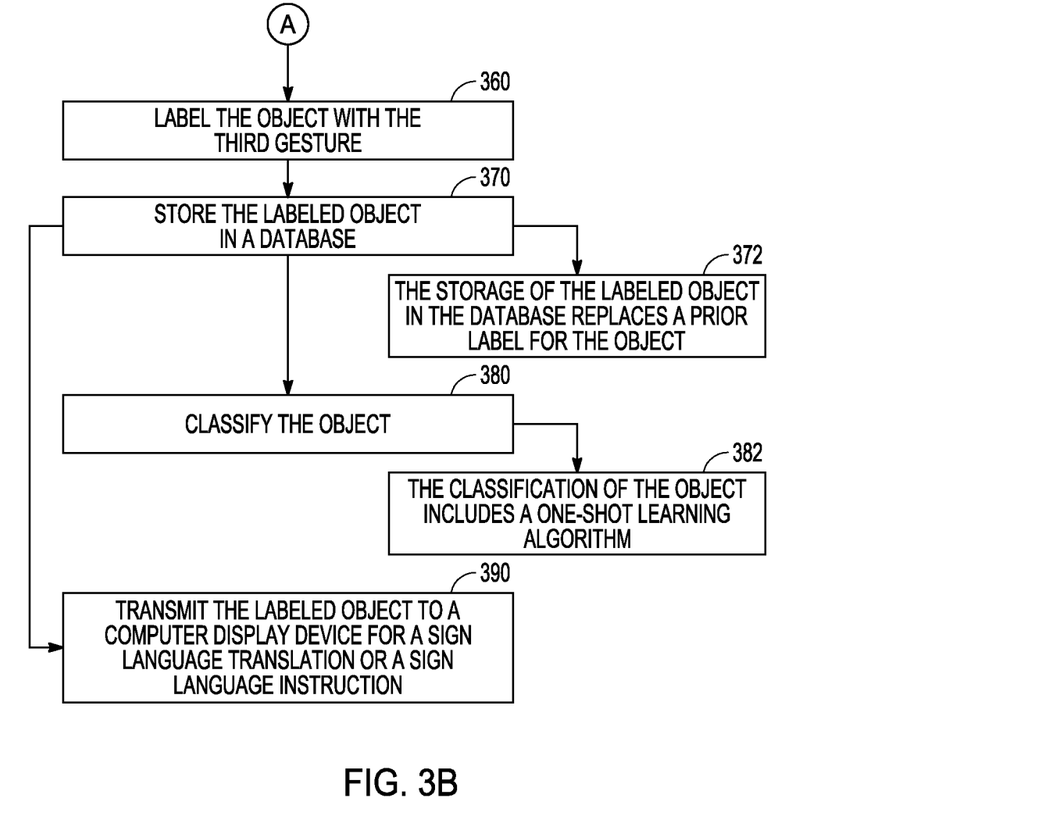

FIGS. 3A and 3B are a block diagram illustrating example embodiments of operations and features of a system and method for identifying objects and labeling objects with a sign from a sign language. FIGS. 3A and 3B include a number of process and feature blocks 310-390. Though arranged substantially serially in the example of FIGS. 3A and 3B, other examples may reorder the blocks, omit one or more blocks, and/or execute two or more blocks in parallel using multiple processors or a single processor organized as two or more virtual machines or sub-processors.

Referring now specifically to FIGS. 3A and 3B, at 310, image data corresponding to an environment are received into a computer processor. The environment includes one or more objects. As indicated at 312, the image data can include a live video and/or a recorded video. At 320, a first gesture of a human hand is detected in the image data. The first gesture identifies an object from the one or more objects in the video data. In an embodiment at 322, the first gesture that identifies the object is a finger pointing gesture.

At 330, the object is detected. In an embodiment, the object is detected using a standard bounding box and computer vision techniques. Known object detectors include YOLO, RetinaNet, R-CNNs, R-CNN, and Faster R-CNN. The object detector generates bounding boxes and labels of each detected object.

At 340, a second gesture of the human hand is detected. The second gesture indicates a readiness to accept a third gesture. As indicated at 342, the third gesture is a sign from a sign language. In an embodiment, as illustrated in operations 344A, 344B and 344C, a user is first prompted to record the first and second gestures, the first and second gestures are then received from the user, and the first and second gestures are then stored in a database.

At 350, the third gesture of the human hand is detected. As indicated at 352, a time period when the readiness to accept the third gesture begins is displayed to the user on a computer display device. As indicated at 354, the detection of the third gesture (and also the detection of the first and second gestures of the human hand (operations 320 and 340)) uses a plurality of points on the human hand and on fingers of the human hand (see FIG. 2). Also, as indicated at 356, the first, second and third gestures of the human hand are detected using computer vision and a machine learning algorithm. At 358, the detection of the third gesture ceases when no motion of the human hand is detected in the image data.

At 360, the object is labeled with the third gesture, and at 370, the labeled object is stored in the database. The output to the database can be in several formats such as npy, png, jpeg, mp4, csv, json, and/or txt. At 372, it is noted that the storage of the labeled object in the database can be a replacement of a prior label for the object. This replacement could be for one or more reasons, such as the label was simply incorrect, the label was not as clear or accurate as it could have been, or some other reason.

At 380, the object is first classified (using a machine learning algorithm). As indicated at 382 (and as noted above), the classification of the object uses a one-shot learning algorithm. For the object classification, one or more of an MLP, a CNN, AlexNet, and/or Inception can be used.

Operation 390 discloses that the labeled object can be transmitted to a user's computer display device for several purposes. For example, the labeled object can be used to instruct someone who does not know or is not familiar with sign language. Also, labeled objects can be used as a translation tool between two people. Labeled objects can also be used as educational tools. As a further example, a teacher can use an embodiment of an object labeling system in the classroom to teach a deaf child a sign of an object. Also, by recording a sign for an object, a deaf person in a home can use the same system to reproduce the sign when showing an object to the camera of the system. The system can also be an operational tool, such as for an application in technical support, wherein a technology company offers a technical support service to solve problems of electronic equipment. A deaf user can show a piece of electronic equipment to the camera, the user records a sign to the camera, and a deaf attendant can understand the sign for that object.

Figure 4:
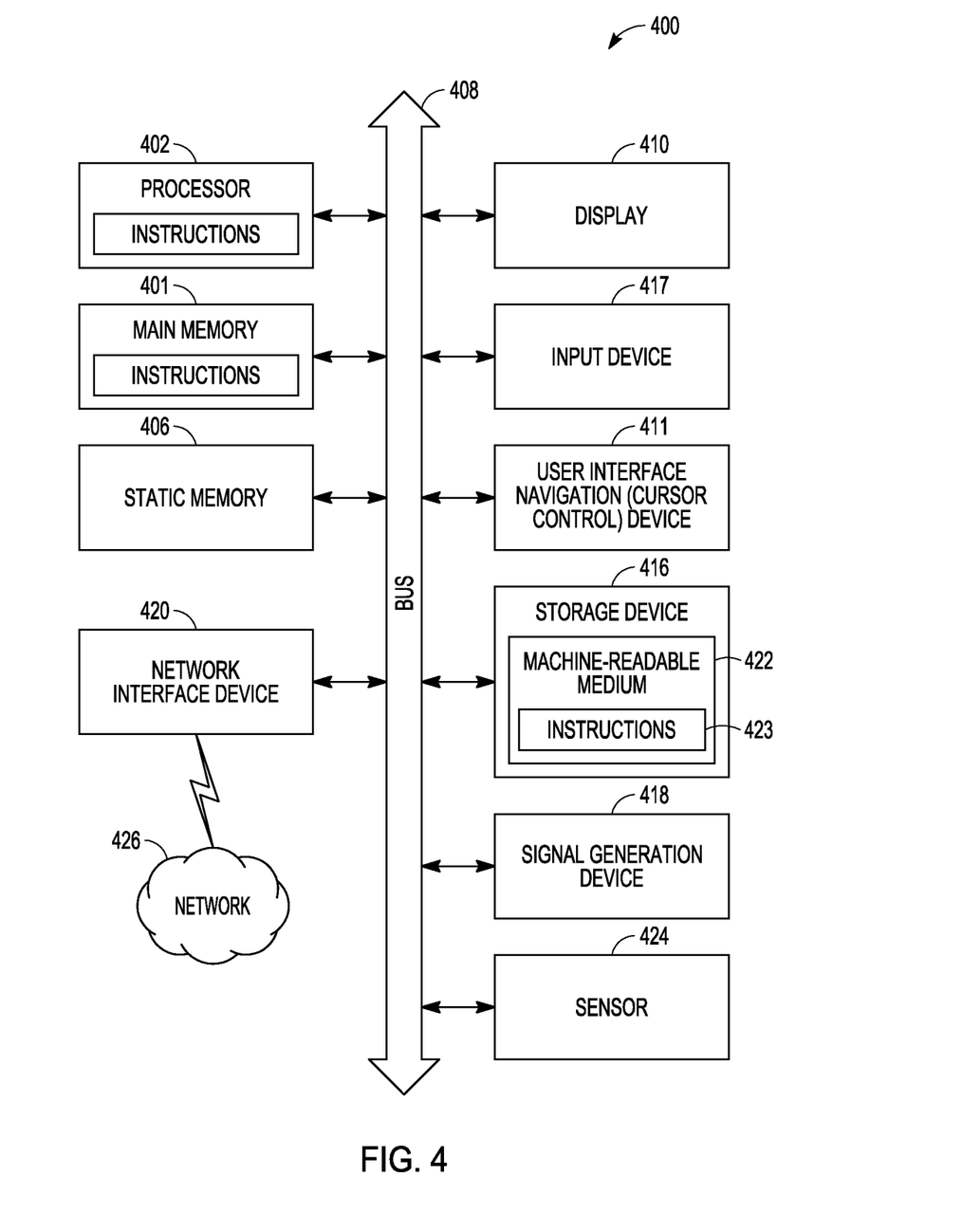
FIG. 4 is a block diagram of a computer architecture upon which one or more of the embodiments disclosed herein can execute.

FIG. 4 is a block diagram illustrating a computing and communications platform 400 in the example form of a general-purpose machine on which some or all the operations of FIGS. 3A and 3B may be carried out according to various embodiments. In certain embodiments, programming of the computing platform 400 according to one or more particular algorithms produces a special-purpose machine upon execution of that programming. In a networked deployment, the computing platform 400 may operate in the capacity of either a server or a client machine in server-client network environments, or it may act as a peer machine in peer-to-peer (or distributed) network environments.

Example computing platform 400 includes at least one processor 402 (e.g., a central processing unit (CPU), a graphics processing unit (GPU) or both, processor cores, compute nodes, etc.), a main memory 401 and a static memory 406, which communicate with each other via a link 408 (e.g., bus). The computing platform 400 may further include a video display unit 410, input devices 417 (e.g., a keyboard, camera, microphone), and a user interface (UI) navigation device 411 (e.g., mouse, touchscreen). The computing platform 400 may additionally include a storage device 516 (e.g., a drive unit), a signal generation device 418 (e.g., a speaker), a sensor 424, and a network interface device 420 coupled to a network 426.

The storage device 416 includes a non-transitory machine-readable medium 422 on which is stored one or more sets of data structures and instructions 423 (e.g., software) embodying or utilized by any one or more of the methodologies or functions described herein. The instructions 423 may also reside, completely or at least partially, within the main memory 401, static memory 406, and/or within the processor 402 during execution thereof by the computing platform 400, with the main memory 401, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 423. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process for receiving image data corresponding to an environment, the environment comprising one or more objects; detecting a first gesture of a human hand in the image data, the first gesture identifying an object from the one or more objects; detecting the object; detecting a second gesture of the human hand, the second gesture indicating a readiness to accept a third gesture; detecting the third gesture of the human hand; labeling the object with the third gesture; and storing the labeled object in a database.

Example No. 2 includes all the features of Example No. 1, and optionally includes a process comprising classifying the object.

Example No. 3 includes all the features of Example Nos. 1-2, and optionally includes a process wherein the classifying the object comprises a one-shot learning algorithm.

Example No. 4 includes all the features of Example Nos. 1-3, and optionally includes a process comprising transmitting the labeled object to a computer display device for one or more of a sign language translation or a sign language instruction.

Example No. 5 includes all the features of Example Nos. 1-4, and optionally includes a process wherein the image data comprise a live video or a recorded video.

Example No. 6 includes all the features of Example Nos. 1-5, and optionally includes a process wherein the detecting the third gesture ceases when no motion of the human hand is detected in the image data.

Example No. 7 includes all the features of Example Nos. 1-6, and optionally includes a process wherein the storage of the labeled object in the database comprises replacing a prior label for the object.

Example No. 8 includes all the features of Example Nos. 1-7, and optionally includes a process wherein the detecting a human hand and the detecting the first, second and third gestures of the human hand comprise using a plurality of points on the human hand and on fingers of the human hand.

Example No. 9 includes all the features of Example Nos. 1-8, and optionally includes a process comprising prompting a user to record the first and second gestures; receiving from the user the first and second gestures, and storing the first and second gestures in the database.

Example No. 10 includes all the features of Example Nos. 1-9, and optionally includes a process wherein the human hand and the first, second and third gestures of the human hand are detected using computer vision and a machine learning algorithm.

Example No. 11 includes all the features of Example Nos. 1-10, and optionally includes a process comprising displaying on a computer display device a time period when the readiness to accept the third gesture begins.

Example No. 12 includes all the features of Example Nos. 1-11, and optionally includes a process wherein the first gesture comprises a finger pointing gesture.

Example No. 13 includes all the features of Example Nos. 1-12, and optionally includes a process wherein the third human gesture comprises a sign from a sign language.

Example No. 14 is a machine-readable medium comprising instructions that when executed by a processor execute a process comprising receiving image data corresponding to an environment, the environment comprising one or more objects; detecting a first gesture of a human hand in the image data, the first gesture identifying an object from the one or more objects; detecting the object; detecting a second gesture of the human hand, the second gesture indicating a readiness to accept a third gesture; detecting the third gesture of the human hand; labeling the object with the third gesture; and storing the labeled object in a database.

Example No. 15 includes all the features of Example No. 14, and optionally includes a machine-readable medium comprising instructions for classifying the object; wherein the classifying the object comprises a one-shot learning algorithm.

Example No. 16 includes all the features of Example Nos. 14-15, and optionally includes a machine-readable medium comprising instructions for transmitting the labeled object to a computer display device for one or more of a sign language translation or a sign language instruction.

Example No. 17 includes all the features of Example Nos. 14-16, and optionally includes a machine-readable medium wherein the detecting the third gesture ceases when no motion of the human hand is detected in the image data.

Example No. 18 includes all the features of Example Nos. 14-17, and optionally includes a machine-readable medium wherein the detecting a human hand and the detecting the first, second and third gestures of the human hand comprise using a plurality of points on the human hand and on fingers of the human hand.

Example No. 19 includes all the features of Example Nos. 14-18, and optionally includes a machine-readable medium wherein the human hand and the first, second and third gestures of the human hand are detected using computer vision and a machine learning algorithm.

Example No. 20 is a system comprising a computer processor; and a computer memory coupled to the computer processor; wherein the computer processor and computer memory are operable for receiving image data corresponding to an environment, the environment comprising one or more objects; detecting a first gesture of a human hand in the image data, the first gesture identifying an object from the one or more objects; detecting the object; detecting a second gesture of the human hand, the second gesture indicating a readiness to accept a third gesture; detecting the third gesture of the human hand; labeling the object with the third gesture; and storing the labeled object in a database.

The invention claimed is:

1. A computer-implemented method comprising:
   receiving image data corresponding to an environment, the environment comprising one or more objects;
   detecting a first gesture of a human hand in the image data, the first gesture identifying an object from the one or more objects;
   detecting the object;
   detecting a second gesture of the human hand, the second gesture indicating a readiness to accept a third gesture;
   detecting the third gesture of the human hand;
   labeling the object with the third gesture; and
   storing the labeled object in a database.

2. The computer-implemented method of claim 1, comprising classifying the object.

3. The computer-implemented method of claim 2, wherein the classifying the object comprises a one-shot learning algorithm.

4. The computer-implemented method of claim 1, comprising transmitting the labeled object to a computer display device for one or more of a sign language translation or a sign language instruction.

5. The computer-implemented method of claim 1, wherein the image data comprise a live video or a recorded video.

6. The computer-implemented method of claim 1, wherein the detecting the third gesture ceases when no motion of the human hand is detected in the image data.

7. The computer-implemented method of claim 1, wherein the storage of the labeled object in the database comprises replacing a prior label for the object.

8. The computer-implemented method of claim 1, wherein the detecting a human hand and the detecting the first, second and third gestures of the human hand comprise using a plurality of points on the human hand and on fingers of the human hand.

9. The computer-implemented method of claim 1, comprising prompting a user to record the first and second gestures; receiving from the user the first and second gestures, and storing the first and second gestures in the database.

10. The computer-implemented method of claim 1, wherein the human hand and the first, second and third gestures of the human hand are detected using computer vision and a machine learning algorithm.

11. The computer-implemented method of claim 1, comprising displaying on a computer display device a time period when the readiness to accept the third gesture begins.

12. The computer-implemented method of claim 1, wherein the first gesture comprises a finger pointing gesture.

13. The computer-implemented method of claim 1, wherein the third human gesture comprises a sign from a sign language.

14. A non-transitory machine-readable medium comprising instructions that when executed by a processor execute a process comprising:
   receiving image data corresponding to an environment, the environment comprising one or more objects;
   detecting a first gesture of a human hand in the image data, the first gesture identifying an object from the one or more objects;
   detecting the object;
   detecting a second gesture of the human hand, the second gesture indicating a readiness to accept a third gesture;
   detecting the third gesture of the human hand;
   labeling the object with the third gesture; and
   storing the labeled object in a database.

15. The non-transitory machine-readable medium of claim 14, comprising instructions for classifying the object; wherein the classifying the object comprises a one-shot learning algorithm.

16. The non-transitory machine-readable medium of claim 14, comprising instructions for transmitting the labeled object to a computer display device for one or more of a sign language translation or a sign language instruction.

17. The non-transitory machine-readable medium of claim 14, wherein the detecting the third gesture ceases when no motion of the human hand is detected in the image data.

18. The non-transitory machine-readable medium of claim 14, wherein the detecting a human hand and the detecting the first, second and third gestures of the human hand comprise using a plurality of points on the human hand and on fingers of the human hand.

19. The non-transitory machine-readable medium of claim 14, wherein the human hand and the first, second and third gestures of the human hand are detected using computer vision and a machine learning algorithm.

20. A system comprising:
- a computer processor; and
- a computer memory coupled to the computer processor;
- wherein the computer processor and computer memory are operable for:
  - receiving image data corresponding to an environment, the environment comprising one or more objects;
  - detecting a first gesture of a human hand in the image data, the first gesture identifying an object from the one or more objects;
  - detecting the object;
  - detecting a second gesture of the human hand, the second gesture indicating a readiness to accept a third gesture;
  - detecting the third gesture of the human hand;
  - labeling the object with the third gesture; and
  - storing the labeled object in a database.

\* \* \* \* \*